UNITED STATES PATENT OFFICE.

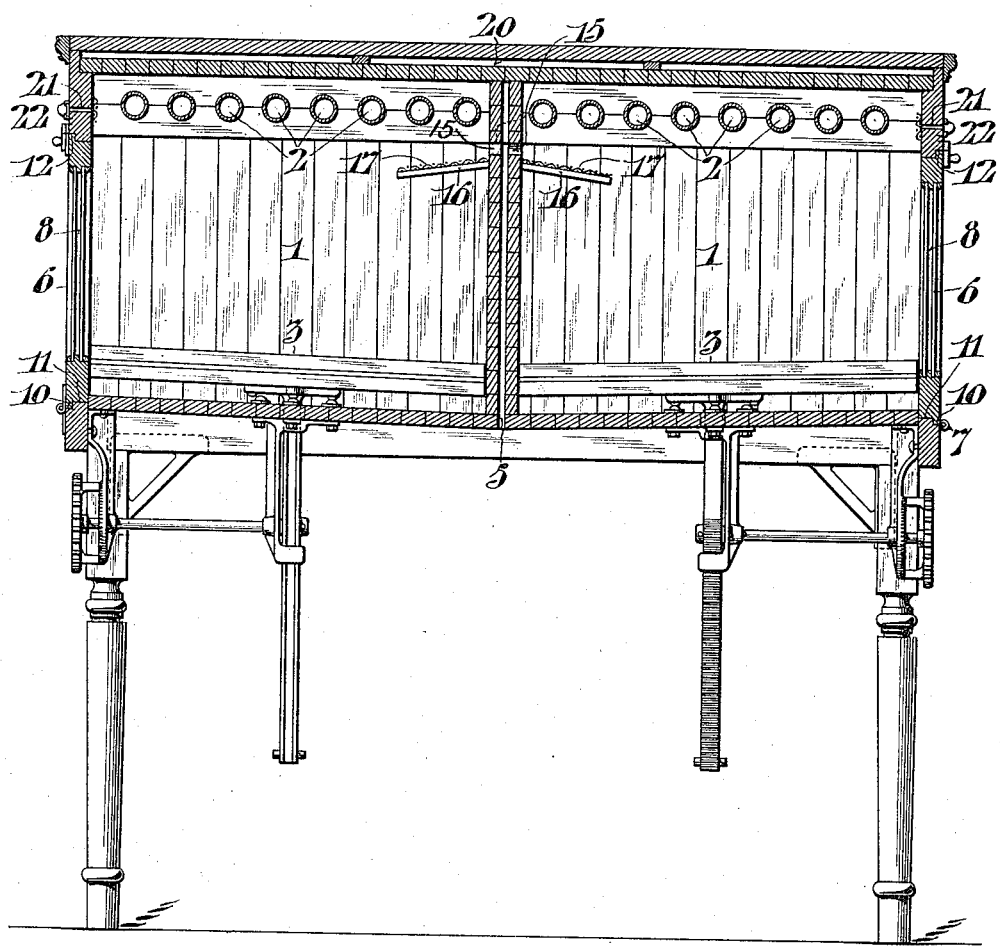

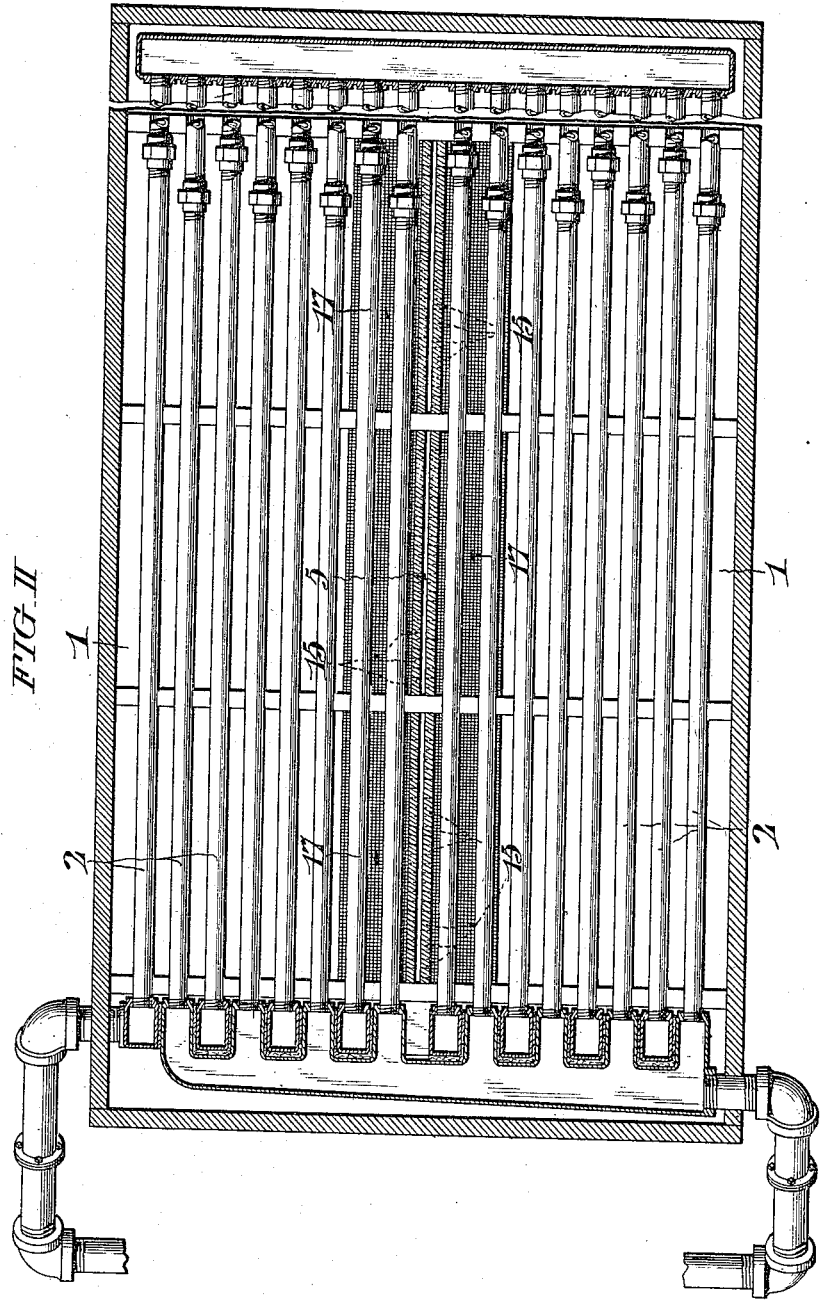

HAROLD L. WATSON, OF NEWTOWN, PENNSYLVANIA, ASSIGNOR, BY MESNE ASSIGNMENTS, TO NEWTOWN GIANT INCUBATOR CORPORATION, OF HARRISONBURG, VIRGINIA, A CORPORATION OF VIRGINIA.

INCUBATOR.

1,146,909.      Specification of Letters Patent.      Patented July 20, 1915.

Application filed October 7, 1910. Serial No. 585,754.

*To all whom it may concern:*

Be it known that I, HAROLD L. WATSON, of Newtown, in the county of Bucks and State of Pennsylvania, have invented certain new and useful Improvements in Incubators, whereof the following is a specification, reference being had to the accompanying drawings.

My invention relates to incubators for the artificial hatching of eggs, and has to do with the construction and arrangement of the parts thereof with special reference to the proper periodical replacing of the air therein.

Incubating eggs absorb oxygen and throw off carbon dioxid. In addition to heat and moisture they require to be immersed for the most part of their incubating period in an atmosphere rich in carbon dioxid which appears to assist in rendering the shell sufficiently brittle for the hatching chick to break through, but along with this requirement is an equally imperative one for a sufficient supply of oxygen calling for the continuous but slow change of the air surrounding the egg.

My invention has special reference to the construction of an incubator in such a way as to make possible the securing and proper regulation of the change of the atmosphere surrounding the eggs in the incubator. To this end the incubators are arranged in rows with a narrow air space between them closed at the top but open at the bottom and with apertures permitting the slow entrance near the top of the incubators of fresh warmed air derived from this source, with corresponding means for slowly taking off the exhaust air. The cooler air from below the incubator enters this air space at the bottom and is gradually warmed as it passes upward by contact with the sides of the air space, becoming hotter as it rises because of the great heat of the wall of the air space near the top. The warming of this vertical column of air thus constantly induces a circulation of fresh air from the floor of the incubator house upward into the air space from which it can only escape through the apertures into the incubating chambers.

In the accompanying drawings, Figure I, is a cross sectional view illustrating incubators embodying my invention. Fig. II, is a sectional plan view of the same.

Each incubating compartment 1, is provided with a system of heating pipes 2, 2, near the top, and with an egg tray 3, adjustably supported near the bottom of the compartment. The series of compartments are supported on legs a proper distance above the floor of the incubator house, and are arranged back to back with a narrow intervening space 5, closed at the top.

Each compartment is provided with a swinging door 6, horizontally hinged at its bottom by means of hinges 7, so as to open downwardly. The door is fitted with two panes of glass with a dead air space 8, between the panes. The door is hinged slightly below the bottom surface of the compartment, so that when opened and swung down, the body of carbon dioxid resting in the bottom of the compartment, flows out immediately. The joint between the bottom of the door and its inclosure is made doubly tight when closed, by the offset 10, in the edge of the door, and the shoulder 11, formed by the bottom of the compartment against which the door closes. These joints are very accurately fitted and made still tighter by packing or stripping if necessary. The side and top joints are also made tight by means of an offset 12.

At the back of each compartment, near the top and a little below the level of the heating pipes, the rear wall of each incubator is pierced by apertures 15, permitting the inflow of fresh air from the median space 5, between the lines of incubators. Immediately below these apertures 15, is a horizontal screen projecting into the incubating compartment, preferably of wire cloth 17, supported on a frame 16. In this way air drawn from below the incubator passes up through the median space 5, being warmed as it travels upward, and through the apertures 15. It is then further warmed by radiation from the heat pipes 2, as it passes over the wire screen 17, so that it reaches the proper temperature before it descends upon the eggs.

The bottom of the incubator is tightly formed of boards permitting little if any percolation of carbon dioxid. The top is formed of a double layer of boards with an intervening air space 20, this retaining in the incubator so far as possible all of the heat radiating from the heating pipes. Between these two tops several layers of heavy insulating paper may be inserted. In each compartment are small exit openings 21, piercing the outer wall above the swinging door and provided with a wire gauze screen, and with a closure 22, so that the amount of air escaping through these may be accurately regulated. If sufficient air escapes through the joints of the comparments or around the edges of the door, to allow for the required change of atmosphere, these openings may be closed altogether.

It will be seen that I confine in each compartment a large percentage of the moisture which constitutes so large a portion of the egg, by retarding the circulation of air through the compartment and by closing the bottom of the compartment by a tight board floor; at the same time I secure a sufficient supply of fresh air to satisfy the requirements of the egg.

Having thus described my invention, I claim:—

1. An incubator including an inclosed casing provided with heating pipes adjacent the top thereof, said casing having apertures in one wall thereof in the region of the heating pipes and allowing the ingress of air, a laterally projecting screen attached to the wall of the casing below said apertures, said screen terminating a short distance from the side wall, said casing having egress apertures in the opposite side, and means for regulating the passage of air through said egress apertures.

2. An incubator including a casing divided longitudinally and transversely into two rows of compartments, each compartment being provided with heating pipes near the top, said casing having an intervening space between the rows of compartments closed at the top, the side walls of the compartment adjacent said space having apertures therein leading to the space and arranged in the region of the heating pipe for allowing the ingress of warm air from the space between the compartments into each compartment, each of said compartments having apertures formed in the walls opposite the apertures permitting the ingress of warm air, and means for regulating the air passing through said egress apertures.

3. An incubator including a casing divided longitudinally and transversely into two rows of compartments, each compartment being provided with heating pipes near the top, said casing having an intervening space between the rows of compartments closed at the top, the side walls of the compartment adjacent said space having apertures therein leading to the space and arranged in the region of the heating pipe for allowing the ingress of warm air from the space between the compartments into each compartment, each of said compartments having apertures formed in the walls opposite the apertures permitting the ingress of warm air, and means for regulating the air passing through said egress apertures, each of said compartments having a screen connected to the wall of the compartment adjacent and below the ingress apertures, said screen being so constructed as to project into the compartment substantially horizontal.

In testimony whereof, I have hereunto signed my name, at Philadelphia, Pennsylvania, this sixth day of October, 1910.

HAROLD L. WATSON.

Witnesses:
JAMES H. BELL,
E. L. FULLERTON.

Copies of this patent may be obtained for five cents each, by addressing the "Commissioner of Patents, Washington, D. C."